Patented July 28, 1925.

1,547,165

UNITED STATES PATENT OFFICE.

GEORGES THÉODORE COURT AND WALTER KARRER, OF BASEL, SWITZERLAND, ASSIGNORS TO THE HOFFMANN-LA ROCHE CHEMICAL WORKS, OF NEW YORK, N. Y., A CORPORATION OF NEW YORK.

STABLE, OILY EMULSIONS OF BISMUTH SALTS AND PROCESS FOR MAKING SAME.

No Drawing.    Application filed October 16, 1923.    Serial No. 668,835.

*To all whom it may concern:*

Be it known that we, GEORGES THÉODORE COURT and WALTER KARRER, citizens of Switzerland, and residents of Basel, Switzerland, have invented certain new and useful Improvements in Stable, Oily Emulsions of Bismuth Salts and Processes for Making Same, of which the following is a specification.

Bismuth compounds have latterly attained more notice in therapy. For the indications in question it is, however, necessary that these compounds should be soluble or spread in such fine particles as to allow their intravenous or parenteral injection. For hypodermic and intra-muscular injections emulsions of insoluble compounds of bismuth have proved particularly appropriate.

It has now been found that stable, oily emulsions of bismuth salts may be obtained by dissolving bismuth salts of fatty acids in suitable organic solvents, mixing the solutions with an oil and driving the solvent off by distillation. The emulsions thus obtained show no sediment even after a prolonged rest. They contain the bismuth compounds in fine particles, which renders them suitable for injection and their absorption easy.

The bismuth salts of superior fatty acids are particularly suited for the preparation of these emulsions. As emulsifying agents may be used the natural oils as well as synthetic fatty acid esters and mineral oils.

Example 1.

1 part of bismuth oleate is dissolved in 10 to 15 parts of ether. The solution, after having been dried with calcinated Glauber's salt and filtered, is mixed with 4 parts of olive oil and the ether driven off first at ordinary pressure, later in the vacuum. Instead of olive oil almond oil or paraffin oil may be used. One obtains white, rather thick, stable emulsions containing 4 per cent bismuth.

Example 2.

1 part of the bismuth salt of tariric acid di-iodide is dissolved in 5 parts of ether. Instead of 5 parts of ether 10 to 15 parts of benzol or 10 parts of petroleum-ether may be used. The solution, after having been dried with calcinated Glauber's salt and filtered, is mixed with 4 parts of olive oil and the ether, benzol or petroleum-ether driven off first at ordinary pressure, later in the vacuum. One obtains light-yellow, thick, stable emulsions containing about 2 per cent bismuth.

Example 3.

1 part of the bismuth salt of linolic acid is dissolved in 15 parts of ether. The dried and filtered solution is mixed with 4 parts of almond oil and the ether driven off first at ordinary pressure, later in the vacuum. One obtains a light-yellow, thick, stable emulsion containing 4 per cent bismuth.

We claim:

1. As new products the stable, oily emulsions of bismuth salt each of which may be produced by dissolving a bismuth salts of a fatty acid in a volatile organic solvent, mixing the solution with an oil and removing the organic solvent by distillation.

2. As new products the stable, oily emulsions of bismuth oleate each of which may be produced by dissolving bismuth oleate in a volatile organic solvent, mixing the solution with an oil and removing the organic solvent by distillation.

3. As a new product the stable, oily emulsion of bismuth oleate which may be produced by dissolving bismuth oleate in ether, mixing the solution with olive oil and removing the ether by distillation.

4. The process for the manufacture of stable, oily emulsions of bismuth salts which consists in dissolving a bismuth salt of a fatty acid in a volatile organic solvent, mixing the solution with an oil and removing the organic solvent by distillation.

5. The process for the manufacture of stable, oily emulsions of bismuth oleate which consists in dissolving bismuth oleate in a volatile organic solvent, mixing the solution with an oil and removing the organic solvent by distillation.

6. The process for the manufacture of a stable, oily emulsion of bismuth oleate which consists in dissolving bismuth oleate in ether, mixing the solution with olive oil and removing the ether by distillation.

In witness whereof we have hereunto set our hand.

GEORGES THÉODORE COURT.
WALTER KARRER.